(12) United States Patent
Ohshima et al.

(10) Patent No.: US 6,226,416 B1
(45) Date of Patent: May 1, 2001

(54) APPARATUS AND METHOD FOR MEASURING ROTATION QUANTITY OF SPHERICAL OBJECT

(75) Inventors: Shinji Ohshima, Akashi; Takashi Teraguchi, Kakogawa, both of (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 08/421,309

(22) Filed: Apr. 13, 1995

(30) Foreign Application Priority Data

Apr. 18, 1994 (JP) .................................... 6-104866

(51) Int. Cl.[7] .............................. G06K 9/36; G06K 9/00
(52) U.S. Cl. ..................... 382/289; 382/107; 382/154; 356/28
(58) Field of Search ..................... 382/100, 154, 382/286, 289, 293, 296, 297, 106, 107; 356/28; 345/126; 348/580, 582–583; 364/559, 731; 395/137

(56) References Cited

U.S. PATENT DOCUMENTS

| | | | |
|---|---|---|---|
| 4,752,828 | * 6/1988 | Chapuis et al. | 348/583 |
| 4,759,076 | * 7/1988 | Tanaka et al. | 382/277 |
| 4,987,299 | * 1/1991 | Kobayashi et al. | 250/231.14 |
| 5,287,626 | * 2/1994 | Reich | 33/1 N |
| 5,479,008 | * 12/1995 | Nishiyama et al. | 250/222.1 |
| 5,568,250 | * 10/1996 | Nishiyama et al. | 356/28 |

* cited by examiner

*Primary Examiner*—Bhavesh Mehta
(74) *Attorney, Agent, or Firm*—Armstrong, Westerman, Hattori, McLeland & Naughton, LLP

(57) ABSTRACT

The invention relates to an apparatus and a method for measuring rotation quantity of a spherical object. A recording device photographs and records a rotating spherical object from one definite direction as a plurality of stationary circular images at definite intervals. An instrumentation device measures positions of definite two points in each of the recorded stationary circular images. An arithmetic unit calculates rotation quantity of the spherical object on each axis of a three-dimensional coordinate-system on the basis of the positions of the two points in each of the stationary circular images.

13 Claims, 4 Drawing Sheets

APPARATUS AND METHOD FOR MEASURING ROTATION QUANTITY OF SPHERICAL OBJECT

BACKGROUND AND SUMMARY OF THE INVENTION

The present invention relates to an apparatus and a method for measuring rotation quantity of a spherical object.

In a conventional method for measuring rotation quantity of a spherical object, rotation quantity of a spherical object (a spinning spherical object) having an unspecific rotation axis such as a golf ball or a tennis ball is obtained by measuring rotation quantities on respective axes of a three-dimensional coordinate-system using an apparatus as shown in FIG. 6.

In the conventional method, picture recording devices 100, 101, and 102 (for example, cameras) are fixed on three axes x, y, and z intersecting perpendicularly with one another, a spherical object 103 to be measured is photographed for plural times at predetermined intervals, and the rotation quantities on the axes are respectively analyzed using the photographed pictures.

The measuring method shown in FIG. 6 requires three picture recording devices, therefore the measuring apparatus as a whole becomes large, and moreover, it is difficult to fix the picture recording devices at positions intersecting perpendicularly with one another in case of outdoor measurement. It is apprehended that the object to be measured (i.e. the spherical object) moves toward one of the picture recording devices, and in this case, there is a high possibility of colliding with the picture recording device and damaging the device. In addition, the method requires analysis for each of the three picture recording devices.

It is therefore an object of the present invention to provide an apparatus for measuring rotation quantity of a spherical object, in which the apparatus as a whole is compact, the installation is easy, and rotation quantity is measured with high accuracy.

It is another object of the present invention to provide a method for measuring rotation quantity of a spherical object, in which rotation quantity is measured easily with high accuracy.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
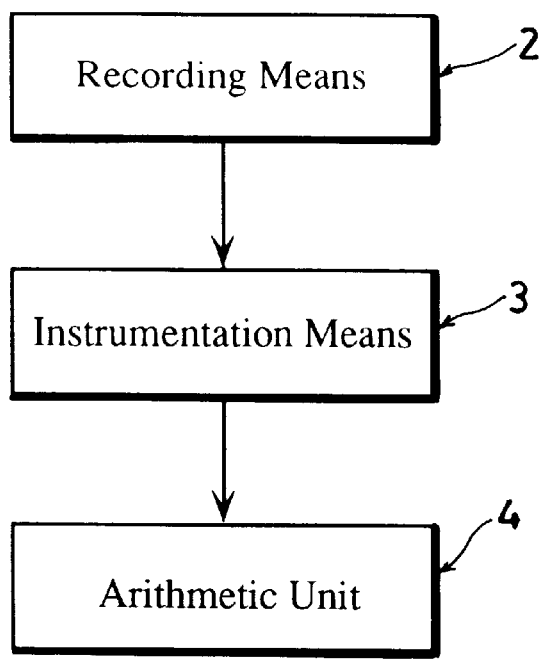
FIG. 1 is a block diagram showing an embodiment of an apparatus for measuring rotation quantity of a spherical object according to the present invention.

FIG. 1 shows an apparatus for measuring rotation quantity (revolutions) of a spherical object according to the present invention, and this apparatus is provided with a recording means 2 photographing and recording a moving and rotating spherical object 1 (see FIG. 2) from a definite direction as a plurality of stationary circular images, an instrumentation means 3 measuring positions of definite two points in each of the stationary circular images recorded by the recording means 2, and an arithmetic unit 4 (an arithmetic operation means) calculating rotation quantity of the spherical object 1 on the basis of the positions of the definite two points in one of the stationary circular images and the positions of the definite two points in another one of the stationary circular images with the first stationary circular image and the second stationary circular image placed one upon another.

Figure 2:
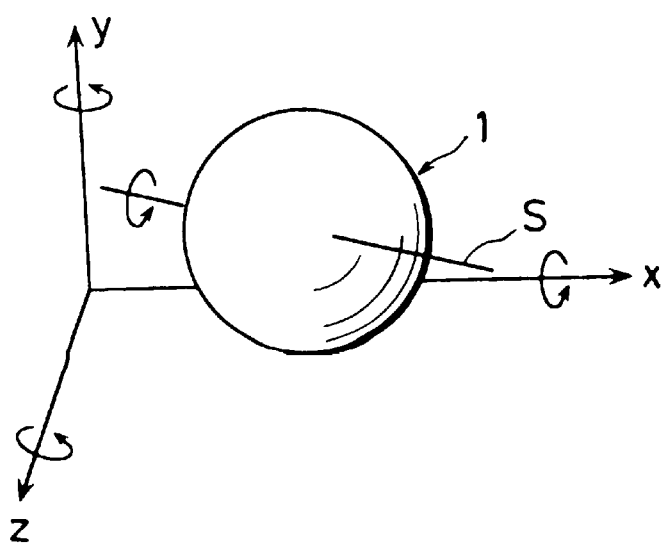
FIG. 2 is a schematic view of a rotating spherical object.

Rotation quantity (revolutions) of a spherical object 1 rotating on a spin axis S as shown in FIG. 2 is conceivable as rotation components on the respective axes x, y, and z. The rotation on the axis y is called side spin, and the rotation on the axis z is called back spin. The rotation on the axis x is rotation with its rotation axis along the moving direction of the ball.

The recording means 2 is, for example, provided with a still camera and a micro flash, a high-speed camera having a shutter, or a high- speed video camera.

In other words, the recording means 2 for obtaining a stationary circular image of a spherical object 1 consists of a photographing portion (for example, a main body of a still camera) and a recording portion (for example, film). When the spherical object 1 rotates or moves at a high speed, the spherical object to be measured is blurred if the photographing time is long. It is therefore necessary to use a high-speed shutter in order to shorten the photographing time or use an illuminator such as a micro flash which lights for a short time in order to obtain a stationary circular image utilizing difference of brightness when the illuminator lights.

The means 2 for obtaining a stationary circular image can be a combination of a still camera, film and a micro flash, a combination of a high-speed still camera, film and a shutter, a combination of a CCD camera, an image memory and a micro flash, or a combination of a high-speed camera, an image memory and a shutter for example.

It is necessary to photograph the spherical object 1 as described above at least for two times at a definite interval, however, these stationary circular images need not to be in a picture. In case these stationary circular images photographed at definite intervals are not in a picture, the directions of the coordinates must be specified in each picture.

As for the instrumentation means 3 measuring the positions of the definite two points in each of the stationary circular images obtained by the recording means 2, if film is used as the recording medium (the recording portion), the film is developed, printed, and the points are measured by directly applying a ruler on the printed picture. It is also possible to use an image input device which can input the images of film or a photograph into the computer and measure the points by adjusting measurement cursor in the computer screen. If an image memory is used as the recording medium, the picture data in the memory is developed on the computer screen and the two points are measured by adjusting measurement cursor as well as in the case of film picture inputted into the computer by using an image input device.

Described below is a method for measuring rotation quantity of a moving and rotating spherical object 1 by using this measuring apparatus.

Figure 3:
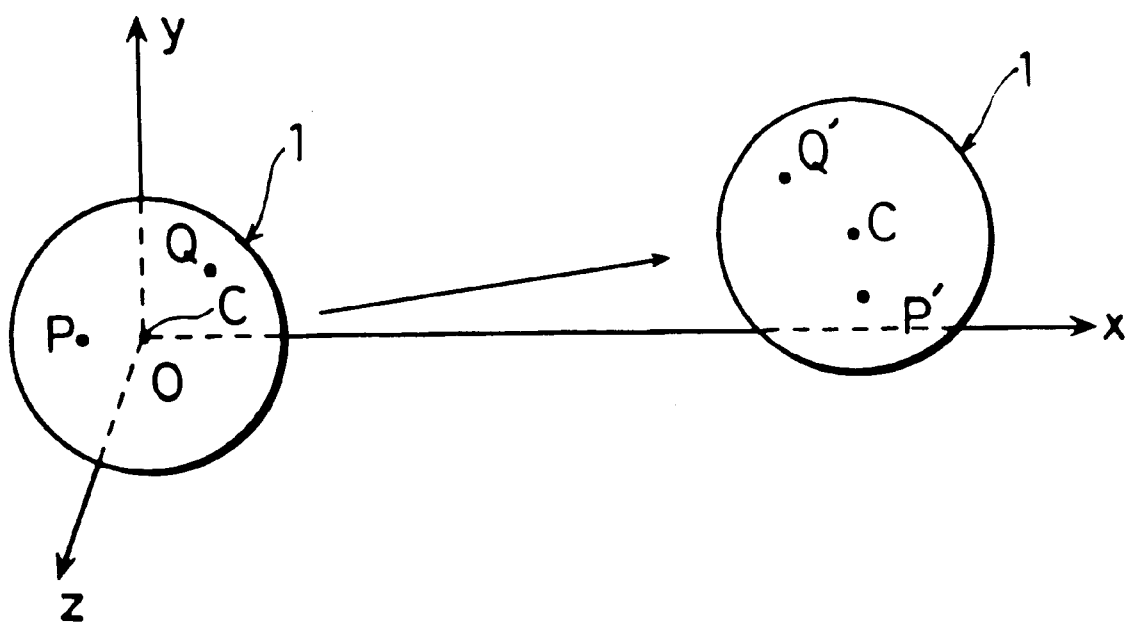
FIG. 3 is a schematic view showing displacement of a spherical object.

Mark points P and Q on a spherical object 1, place the center C of the spherical object 1 at the origin of the axes x, y, and z as shown in FIG. 3, and assume that the points P and Q move to points P' and Q' respectively owing to rotation on a rotation axis including the center C of the spherical object 1. The points P and Q can be at any positions on condition that these points P and Q are confirmable in the photographed picture.

In the concrete, a still camera and a micro flash are placed on the axis z, the flash is directed toward the spherical object 1 (a golf ball, for example) while the spherical object 1 passes in front of the camera, and light is emitted two times at an interval of $3 \times 10^{-3}$ second. In the interim, the shutter of the camera is kept open. The two images of the spherical object 1 can be photographed in one frame by adjusting iris diaphragm of the camera and timing for the light emissions of the flash.

The values of X coordinate and Y coordinate are obtained by measurement on the picture, and the value of Z coordinate is expressed by the following equation from an equation of a sphere assuming that the radius of the spherical object 1 in the picture is R.

$$Z = \sqrt{R^2 - X^2 - Y^2}$$

There are various methods for measuring the values of X coordinate and Y coordinate. When a still camera is used, the film is developed, or developed and printed, and the picture is analyzed. In case of only developing the film, each image of the film is enlarged to an appropriate size through a universal projector, X coordinate and Y coordinate of each image are pointed by a two-dimensional digitizer connected to the computer (the arithmetic unit 4), and the coordinate values are inputted into the computer (the arithmetic unit 4). In case of printing the film, the images are once inputted into the computer (the arithmetic unit 4) using an image input device, and X coordinate and Y coordinate in each inputted image are measured and calculated.

Figure 4:
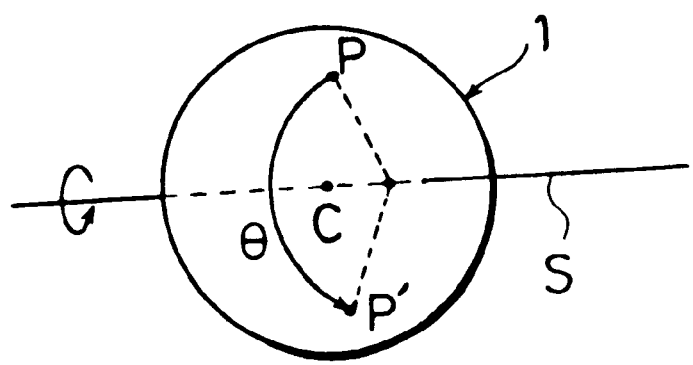
FIG. 4 is a schematic view showing a stationary circular image.

In the three-dimensional coordinate-system with its origin at the center C of the spherical object 1 (see FIG. 3) which two images have been placed one upon another as shown in FIG. 4, the points P and Q move to the points P' and Q' respectively in t seconds owing to rotation on a rotation axis including the center C of the spherical object 1 (the origin). Therefore the point P (xp, yp, zp) moves to the point P' (xp', yp', zp'), and the point Q (xq, yq, zi) moves to the point Q' (xq', yq', zq') by the rotation.

Naming this rotation axis "a spin axis S", the following equation ① is formed concerning a unit vector $v = (\alpha, \beta, \gamma)$ of a direction vector of the spin axis S.

$$\alpha^2 + \beta^2 + \gamma^2 = 1 \qquad ①$$

As shown in FIG. 4, vector PP' is perpendicular to the vector v because the movement from the point P to the point P' is considered to be rotation in a plane perpendicular to the vector v, and the following equation ② is formed.

$$\alpha(xp-xp') + \beta(yp-yp') + \gamma(zp-zp') = 0 \qquad ②$$

The same applies to the points Q and Q', and the following equation ③ is obtained.

$$\alpha(xq-xq') + \beta(yq-yq') + \gamma(zq-zq') = 0 \qquad ③$$

The direction vector v is therefore obtained as follows by solving the above mentioned equations ①, ②, and ③ simultaneously.

$$\gamma = 1/\sqrt{\sqrt{A}}$$

$$\beta = \beta\gamma$$

$$\alpha = -\{\beta(yp-yp') + \gamma(zp-zp')\}/(xp-xp')$$

or $$\alpha = -\{\beta(yq-yq') + \gamma(zq-zq')\}/(xq-xq')$$

In this case, $$B = -\frac{(xp-xp')(zq-zq') - (xq-xq')(zp-zp')}{(xp-xp')(yq-yq') - (xq-xq')(yp-yp')}$$

$$A = 1 + B^2 + \frac{\{B(yp-yp') + (zp-zp')\}^2}{(xp-xp')^2}$$

or $$A = 1 + B^2 + \frac{\{B(yq-yq') + (zq-zq')\}^2}{(xq-xq')^2}$$

The foot of a perpendicular line (xhp, yhp, zhp) from the point P or the point P' is expressed as follows.

$$xhP = t_1\alpha$$

$$yhp = t_1\beta$$

$$zhp = t_1\gamma$$

In this case, $t_1 = \alpha xp + \beta yp + \gamma zP$, or $t_1 = \alpha xp' + \beta yp' + \gamma zP'$.

Next, the foot of a perpendicular line (xhq, yhq, zhq) from the point Q or the point Q' is expressed as follows.

$$xhq = t_2\alpha$$

$$yhq = t_2\beta$$

$$zhq = t_2\gamma$$

In this case, $t_2 = \alpha xq + \beta yq + \gamma zq$, or $t_2 = \alpha xq' + \beta yq' + \gamma zq'$.

Consequently, equations concerning the angle θ (in degree) of rotation on the spin axis S in t seconds are obtained as follows.

$$\cos\theta = \frac{(xp-xhp)(xp'-xhp) + (yp-yhp)(yp'-yhp) + (zp-zhp)(zp'-zhp)}{\sqrt{(xp-xhp)^2 + (yp-yhp)^2 + (zp-zhp)^2} \times \sqrt{(xp'-xhp)^2 + (yp'-yhp)^2 + (zp'-zhp)^2}}$$

or $$\cos\theta = \frac{(xq-xhq)(xq'-xhq) + (yq-yhq)(yq'-yhq) + (zq-zhq)(zq'-zhq)}{\sqrt{(xq-xhq)^2 + (yq-yhq)^2 + (zq-zhq)^2} \times \sqrt{(xq'-xhq)^2 + (yq'-yhq)^2 + (zq'-zhq)^2}}$$

Therefore, the number of revolutions $S_0$ of the spherical object 1 on the spin axis S in t seconds is expressed as follows.

$$S_0 = (\delta/360) \times (60/t) [\text{r.p.m.}]$$

The rotation quantities on the respective axes are the resolution of said number of revolutions $S_0$ into the respective components of the direction vector v, therefore the following equations are obtained.

The rotation quantity (on the axis x) $Sx=\alpha S_0$

The rotation quantity (on the axis y) $Sy=\beta S_0$

The rotation quantity (on the axis z) $Sz=\gamma S_0$

The rotation quantities of a moving and rotating spherical object on the respective axes of a three-dimensional coordinate-system are hence obtained by photographing and recording from one direction.

Figure 5A:
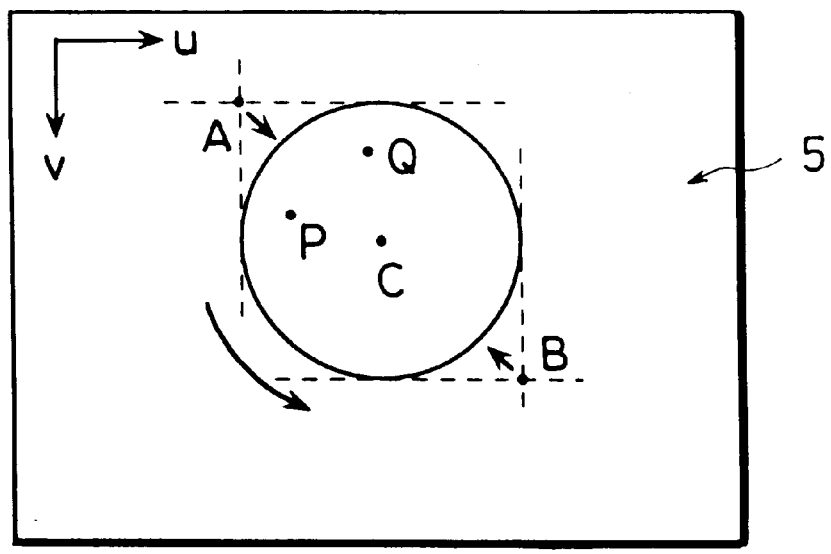
FIG. 5A is a schematic view showing a stationary circular image.
Figure 5B:
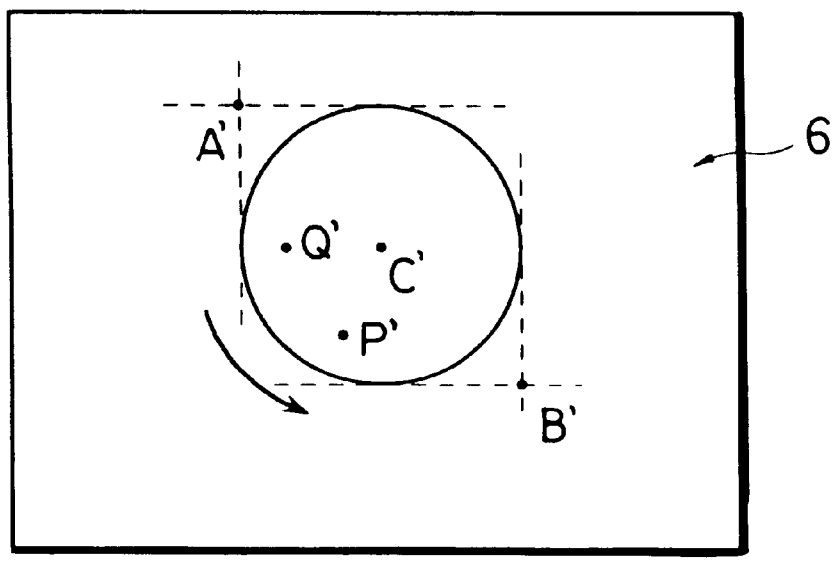
FIG. 5B is a schematic view showing a stationary circular image.
Figure 6:
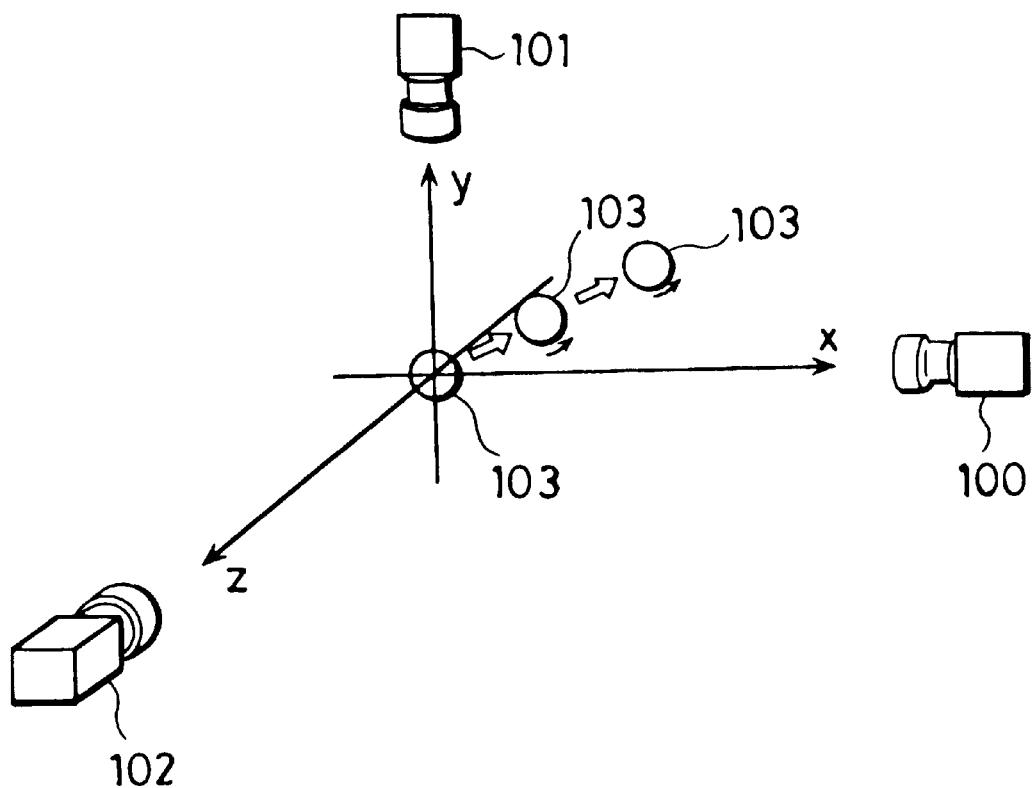
FIG. 6 is a schematic perspective view of a conventional apparatus for measuring rotation quantity of a spherical object.

Next, FIGS. 5A and 5B show stationary circular images obtained by using a combination of a CCD camera, an image memory and a micro flash, and Table 1 shows arithmetic results of measuring the points in the computer screen and calculating the rotation quantities on the three axes. In this case, the time interval between the screens 5 and 6 is $3\times10^{-3}$ second. According to this method, development of the film is not required, and measurement in almost real-time is available.

$uc=(ua+ub)/2$ $vc=(va+vb)/2$ because the point C is the middle point of the points A and B.

Defining the spherical radius in the direction of u as rad_u. and that in the direction of v as rad_v, $rad\_u=|(ua-ub)/2|$ $rad\_v=|(va-vb)/2|$ "| |" indicates absolute value.

In order to equalize the spherical radiuses of the images in FIG. 5A and FIG. 5B, the radiuses are standardized to 1 using these spherical radiuses rad_u and rad_v.

In this case, while the direction of u is the same with the direction of x of the x, y, z coordinate-system, the direction

TABLE 1

|    | A        | B        | P        | Q        | A'       | B'       | P'       | Q'       | back spin | side spin | axis spin |
|----|----------|----------|----------|----------|----------|----------|----------|----------|-----------|-----------|-----------|
| 1  | 37, 49   | 309, 320 | 106, 177 | 169, 260 | 157, 127 | 421, 390 | 232, 308 | 333, 327 | 2334      | −221      | 305       |
| 2  | 40, 54   | 310, 323 | 122, 173 | 214, 104 | 164, 131 | 428, 396 | 251, 297 | 274, 185 | 2264      | 3         | 327       |
| 3  | 37, 54   | 308, 325 | 91, 186  | 180, 108 | 158, 136 | 420, 400 | 230, 333 | 238, 219 | 2483      | −158      | 339       |
| 4  | 37, 53   | 306, 323 | 85, 205  | 199, 104 | 157, 133 | 420, 396 | 239, 347 | 252, 197 | 2414      | −182      | 324       |
| 5  | 33, 48   | 306, 318 | 227, 101 | 278, 194 | 150, 126 | 411, 389 | 270, 169 | 368, 200 | 2427      | 83        | 310       |
| 6  | 18, 43   | 290, 311 | 63, 191  | 153, 85  | 108, 113 | 373, 379 | 202, 338 | 167, 210 | 3070      | −117      | 424       |
| 7  | 28, 39   | 300, 309 | 77, 179  | 168, 61  | 136, 109 | 399, 371 | 223, 324 | 180, 182 | 3036      | −217      | 362       |
| 8  | 24, 35   | 294, 305 | 54, 210  | 173, 55  | 121, 100 | 384, 362 | 218, 341 | 179, 151 | 2724      | −156      | 252       |
| 9  | 16, 40   | 287, 308 | 84, 164  | 149, 114 | 104, 109 | 366, 370 | 195, 293 | 199, 212 | 2722      | 118       | 360       |
| 10 | 22, 24   | 294, 295 | 77, 162  | 186, 248 | 120, 77  | 381, 341 | 212, 284 | 342, 246 | 2991      | 37        | 414       |
| 11 | 102, 199 | 376, 472 | 193, 402 | 229, 304 | 223, 44  | 493, 313 | 342, 283 | 273, 208 | 3019      | −1788     | 226       |
| 12 | 114, 131 | 388, 405 | 190, 303 | 242, 234 | 191, 44  | 462, 314 | 279, 279 | 236, 207 | 3285      | −1915     | 76        |
| 13 | 127, 178 | 397, 451 | 264, 432 | 183, 356 | 220, 131 | 486, 398 | 435, 290 | 385, 379 | 5496      | −2416     | 359       |
| 14 | 128, 166 | 400, 437 | 220, 259 | 324, 253 | 242, 119 | 510, 386 | 390, 214 | 468, 183 | 869       | 1714      | −19       |
| 15 | 123, 173 | 394, 445 | 193, 266 | 264, 395 | 227, 134 | 496, 402 | 352, 238 | 453, 332 | 1188      | 1831      | −39       |

*The values of A, B, P, Q, A', B', P', and Q' indicate u, v coordinate values in FIG. 5A and FIG. 5B.

In this case, uv coordinate-systems are arranged in the screens 5 and 6, A and A' are the intersecting points of the tangent lines touching the top demarcations and the left demarcations of the stationary circular images of the spherical object 1, and B and B' are the intersecting points of the tangent lines touching the bottom demarcations and the right demarcations of the stationary circular images of the spherical object 1.

A, A', B, and B' are measured in order to calculate the center positions and the radiuses of the stationary circular images of the spherical object 1. In Table 1, spins are indicated in r.p.m., a plus value of "back spin" expresses counterclockwise rotation of the spherical object 1 in FIG. 5A and 5B, a plus value of "side spin" expresses rotation which curves the spherical object 1 to the left (hook spin), and a plus value of "axis spin" expresses rotation clockwise to the moving direction of the spherical object 1.

When two images of the spherical object 1 are photographed as shown in FIG. 5A and FIG. 5B, the two images in the screen practically differ in size due to the moving direction (receding from or approaching to the camera) of the spherical object 1. It is therefore necessary to transform the coordinates as described below and place the two images one upon another.

First, the uv coordinates of the points in FIG. 5A are to be respectively expressed as follows.

The point A (ua, va), the point B (ub, vb), the point C (uc, vu), the point P (up, vp), and the point Q (uq, vq).

Using the above expression, of v opposes to the direction of y, hence the points P and Q in FIG. 5A need to be transformed from the uv coordinate-system to the x, y, z coordinate-system as follows.

$xp=(up-uc)/rad\_u$ $yp=-(vp-vc)/rad\_v$ $zp=\sqrt{1-xp^2-yp^2}$ $xq=(uq-uc)/rad\_u$ $yq=-(vq-vc)/rad\_v$ As for the points P' and Q' in FIG. 5B, $uc'=(ua'+ub')/2$ $vu'=(va'+vb')/2$ because the point C' is the middle point of the points A' and B'.

Defining the spherical radius in the direction of u as rad_u', and that in the direction of v as rad_v'.

$rad\_u'=|(ua'-ub')/2|$ $rad\_v'=|(va'-vb')/2|$

Transforming the points P' and Q' in FIG. 5B from the uv coordinate-system to the x, y, z coordinate-system, $xp'=(up'-uc')/rad\_u'$ $$yp' = -(vp' - vc')/\text{rad}\_v'$$

$$zp' = \sqrt{1 - xp'^2 - yp'^2}$$

$$xq' = (uq' - uc')/\text{rad}\_u'$$

$$yq' = -(vq' - vc')/\text{rad}\_v'$$

$$zq' = \sqrt{1 - xq'^2 - yq'^2}$$

The calculation described above is conducted using the x, y, z coordinate values transformed as described above.

In the foregoing embodiments, rotation quantity of a moving and rotating spherical object is measured, however, rotation quantity of a rotating but not moving spherical object (i.e. a spherical object only rotating on a rotation axis) can also be calculated on each axis of a three-dimensional coordinate-system by using the foregoing measuring apparatus.

The number of the stationary circular images of the spherical object 1 recorded by the recording means 2 can be three or more in stead of two, and more accurate rotation quantity is obtained as the number increases.

The spherical object 1 can be any spinning spherical object having an unspecific rotation axis such as a golf ball or a tennis ball.

According to the present invention, rotation quantity of a rotating spherical object 1 on each axis of a three-dimensional coordinate-system is obtained with high accuracy by photographing and recording from one definite direction. Moreover, the measuring apparatus as a whole is compact and the installation is easy.

Furthermore, rotation quantity of a moving and rotating spherical object 1 on each axis of a three-dimensional coordinate-system is obtained with high accuracy by photographing and recording from one definite direction according to the present invention, in which the measuring apparatus as a whole is compact and the installation is easy. Moreover, the present invention assures safety from being struck and damaged by the moving spherical object 1 to be measured.

Besides, if two stationary circular images are to be recorded, data of the two images are sufficient to obtain the rotation quantity, which simplifies the calculation and shortens the time for the calculation.

While preferred embodiments of the present invention have been described in this specification, it is to be understood that the invention is illustrative and not restrictive, because various changes are possible within the spirit and indispensable features.

We claim:

1. An apparatus for measuring rotation quantity of a spherical object, provided with a recording means photographing and recording a rotating spherical object from one definite direction as a plurality of stationary circular images, an instrumentation means measuring positions of definite two points in each of the plurality of stationary circular images recorded by said recording means, and an arithmetic unit calculating rotation quantity of the spherical object on each axis of a three-dimensional coordinate-system on the basis of the positions of the definite two points in each of the stationary circular images.

2. An apparatus for measuring rotation quantity of a spherical object, provided with a recording means photographing and recording a moving and rotating spherical object from one definite direction as a plurality of stationary circular images, an instrumentation means measuring positions of definite two points in each of the plurality of stationary circular images recorded by said recording means, and an arithmetic unit calculating rotation quantity of the spherical object on each axis of a three-dimensional coordinate-system on the basis of the positions of the definite two points in one of the stationary circular images and the positions of the definite two points in another one of the stationary circular images with the centers of the stationary circular images placed one upon another.

3. The apparatus for measuring rotation quantity of a spherical object as set forth in claim 1 or claim 2, wherein the recording means is provided with a still camera and a micro flash.

4. The apparatus for measuring rotation quantity of a spherical object as set forth in claim 1 or claim 2, wherein the recording means is provided with a high-speed camera having a shutter.

5. The apparatus for measuring rotation quantity of a spherical object as set forth in claim 1 or claim 2, wherein the recording means is provided with a high-speed video camera.

6. The apparatus for measuring rotation quantity of a spherical object as set forth in claim 1 or claim 2, wherein the instrumentation means is provided with an image input device.

7. The apparatus for measuring rotation quantity of a spherical object as set forth in claim 1 or claim 2, wherein the number of the stationary circular images recorded by the recording means is two.

8. The apparatus for measuring rotation quantity of a spherical object as set forth in claim 1 or claim 2, wherein the spherical object is a golf ball.

9. The apparatus for measuring rotation quantity of a spherical object as set forth in claim 1 or claim 2, wherein the spherical object is a tennis ball.

10. A method for measuring rotation quantity of a spherical object, wherein a rotating spherical object is photographed and recorded from one definite direction as a plurality of stationary circular images at definite intervals, positions of definite two points in each of the recorded stationary circular images are measured, and rotation quantity of the spherical object on each axis of a three-dimensional coordinate- system is operated on the basis of the positions of said two points in each of the stationary circular images.

11. A method for measuring rotation quantity of a spherical object, wherein a moving and rotating spherical object is photographed and recorded from one definite direction as a plurality of stationary circular images at definite intervals, positions of definite two points in each of the recorded stationary circular images are measured, a center of a first stationary circular image is placed upon a center of a second stationary circular image, and under this situation, rotation quantity of the spherical object on each axis of a three-dimensional coordinate-system is operated on the basis of the positions of the definite two points in said first stationary circular image and the positions of the definite two points in said second stationary circular image.

12. The method for measuring rotation quantity of a spherical object as set forth in claim 10 or claim 11, wherein the spherical object is a golf ball.

13. The method for measuring rotation quantity of a spherical object as set forth in claim 10 or claim 11, wherein the spherical object is a tennis ball.

* * * * *